(12) United States Patent
Prickel

(10) Patent No.: US 9,733,634 B2
(45) Date of Patent: Aug. 15, 2017

(54) AIR PRESSURE DIFFERENTIAL CONTROL SYSTEM OF AGRICULTURAL PLANTERS

(71) Applicant: CNH Industrial America LLC, New Holland, PA (US)

(72) Inventor: Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/755,045

(22) Filed: Jun. 30, 2015

(65) Prior Publication Data
US 2017/0000016 A1   Jan. 5, 2017

(51) Int. Cl.
| | | |
|---|---|---|
| *A01C 7/20* | (2006.01) | |
| *A01C 7/04* | (2006.01) | |
| *G05B 15/02* | (2006.01) | |
| *A01C 7/08* | (2006.01) | |
| *A01C 7/10* | (2006.01) | |
| *A01B 73/06* | (2006.01) | |

(52) U.S. Cl.
CPC .............. *G05B 15/02* (2013.01); *A01C 7/081* (2013.01); *A01C 7/102* (2013.01); *A01B 73/065* (2013.01)

(58) Field of Classification Search
CPC ........... A01C 7/04–7/046; A01C 7/081–7/084; A01C 7/102; A01B 73/065; G05B 15/02
USPC .......................................................... 111/185
See application file for complete search history.

(56) References Cited

U.S. PATENT DOCUMENTS

| | | | |
|---|---|---|---|
| 3,637,108 A * | 1/1972 | Loesch .............. | B65G 47/1428 221/211 |
| 4,343,414 A * | 8/1982 | Lark ...................... | A01C 7/102 111/179 |
| 5,956,255 A | 9/1999 | Flamme | |
| 6,003,455 A * | 12/1999 | Flamme ................. | A01C 15/00 111/200 |
| 6,070,539 A | 6/2000 | Flamme et al. | |
| 6,198,986 B1 | 3/2001 | McQuinn | |
| 6,463,866 B2 | 10/2002 | Huffmeyer | |
| 7,373,890 B2 | 5/2008 | Kowalchuk | |
| 7,490,565 B2 | 2/2009 | Holly | |
| 7,617,785 B2 | 11/2009 | Wendte | |
| 7,735,438 B2 | 6/2010 | Riewerts | |

(Continued)

OTHER PUBLICATIONS

"Deere unveils new high speed row planter unit", Farm & Ranch Guide, pp. 1-3, Feb. 25, 2014 (3 pages).

*Primary Examiner* — John G Weiss
(74) *Attorney, Agent, or Firm* — Rebecca L. Henkel; Rickard K. DeMille

(57) ABSTRACT

An agricultural planter including a frame member, a conveyance system, a seeding system and an air pressure differential system. The conveyance system is coupled to the frame member and the conveyance system allows for the moving of the planter at a ground speed. The seeding system is coupled to the frame member. The air pressure differential system is operatively coupled to the seeding system. The air pressure differential system includes an air pressure differential producing apparatus for producing an air pressure difference and a controller. The controller is in controlling communication with the air pressure differential producing apparatus. The controller is configured to select the air pressure difference dependent upon the ground speed of the planter.

18 Claims, 5 Drawing Sheets

(56) References Cited

U.S. PATENT DOCUMENTS

| | | | |
|---|---|---|---|
| 8,386,137 B2 | 2/2013 | Sauder et al. | |
| 8,511,242 B2 | 8/2013 | Applegate et al. | |
| 8,516,969 B2 | 8/2013 | Wendte et al. | |
| 8,684,636 B2 * | 4/2014 | Dunstan | A01C 7/081 |
| | | | 111/175 |
| 8,726,820 B2 | 5/2014 | Wollenhaupt et al. | |
| 8,746,158 B2 * | 6/2014 | Binsirawanich | G01F 1/74 |
| | | | 111/174 |
| 8,893,630 B2 * | 11/2014 | Kowalchuk | A01C 7/102 |
| | | | 111/174 |
| 8,942,896 B2 * | 1/2015 | Mayerle | A01C 7/102 |
| | | | 111/185 |
| 9,426,940 B2 * | 8/2016 | Connors | A01C 7/102 |
| 2008/0295751 A1 | 12/2008 | Shoup et al. | |
| 2012/0266795 A1 | 10/2012 | Silbernagel et al. | |
| 2013/0124055 A1 | 5/2013 | Baurer et al. | |
| 2014/0048002 A1 | 2/2014 | Grimm et al. | |

\* cited by examiner

AIR PRESSURE DIFFERENTIAL CONTROL SYSTEM OF AGRICULTURAL PLANTERS

BACKGROUND OF THE INVENTION

1. Field of the Invention

The present invention relates to air pressure controls used in the agricultural field, and, more particularly, to an air pressure control system used on planters.

2. Description of the Related Art

Agricultural planters are commonly used implements to plant seeds in soil. An agricultural planter can include a chassis that carries one or more storage tanks carrying seed, and chemical applications that are to be applied to the field during the planting operation, a hitch mechanism that attaches to a tractor or other implement pulled by a tractor, and a tool bar that row units can be connected to so they are carried by the chassis. The planter can also include a pneumatic system carried by the chassis that supplies pressurized air to transport the seeds or other particulate from the storage tanks to the row units.

Each row unit of the agricultural planter independently places seeds in the field. Typically, the row units are laterally arranged along a length of the tool bar so that as the planter is pulled across the field, each row unit plants seeds at predefined intervals along the path it is pulled across. To plant seeds, the row units perform four main operations as they are pulled: opening a trench in the soil; placing a seed into the formed trench at appropriate intervals; closing the formed trench to put soil on top of the placed seed; and packing soil on top of the seed to provide desirable soil contact with the placed seed. To open a trench in the soil, a furrowing disc system, also called an opening disc, cuts into the soil and rotates, dislocating soil as it rotates to form the trench. Once the trench is open, a seed is placed in the trench by a metering device which receives seeds from the main storage tank(s) or a row unit storage tank and typically utilizes a combination of differential air pressure, to select the seed, and gravity to place the seed in the trench at predefined intervals along the pulled path so that adjacent seeds in the row are not too close to one another. One or more closing discs carried behind the furrowing disc are pressed into the soil and also rotate as the planter is pulled to replace soil dislocated by the furrowing disc in the trench or dislocate adjacent soil into the trench to cover the seed placed in the trench with soil. Finally, a pressing wheel carried behind the closing disc(s) exerts pressure on the soil covering the seed to press the soil down onto the seed and provide good soil contact with the seed. By having multiple row units working in unison as the planter is pulled across a field, many seeds can be effectively planted in an efficient manner.

The vacuum fan has a key roll in the apparatus used for planting seeds in a field. Among other possible functions, it is used to create a pressure differential within a series of seed metering devices, which results in seeds adhering onto a metering disk so that they may be accurately and consistently delivered through the planter mechanism to the soil. The fan for this purpose typically has a high flow rate owing to the number of planter components. In the arrangement of the planter, the fan is coupled to the planter that is behind the operator of a tractor used to pull or support the planting apparatus. The inlet or suction side of the fan is connected to the seed metering mechanisms. The rotational speed of the fan is set by a selection of the operator and is generally in the 3,000 to 5,000 RPM range, depending upon the capacity of the fan and the number of row units connected. The speed of the fan or vacuum level, having been selected, is maintained during the planting operation until the set point is reselected by the operator.

A problem with the prior art is that the fan speed or the vacuum level selected by the operator is not altered even though the planter changes operating speeds and executes turns. Another problem is that the force required to transition a seed from a stationary position to a dynamic position increases as the velocity of the metering device increases, proportional to the travel speed, and conversely as the travel speed decreases and this is not compensated for in the prior art.

Accordingly, what is needed in the art is a vacuum fan that is responsive to changes in the operating conditions of the planter.

SUMMARY OF THE INVENTION

The invention seeks to provide an air pressure differential control sensitive to changes in planting speeds and seed delivery parameters.

In one form, the invention is directed to an agricultural planter including a frame member, a conveyance system, a seeding system and an air pressure differential system. The conveyance system is coupled to the frame member and the conveyance system allows for the moving of the planter at a ground speed. The seeding system is coupled to the frame member. The air pressure differential system is operatively coupled to the seeding system. The air pressure differential system includes an air pressure differential producing apparatus for producing an air pressure difference and a controller. The controller is in controlling communication with the air pressure differential producing apparatus. The controller is configured to select the air pressure difference dependent upon the ground speed of the planter.

In another form, the invention is directed to an air pressure differential system for use on an agricultural planter, the planter capable of being towed at a ground speed. The air pressure differential system including an air pressure differential producing apparatus for producing an air pressure difference and a controller. The controller is in controlling communication with the air pressure differential producing apparatus. The controller being configured to select the air pressure difference dependent upon the ground speed of the planter.

In another form, the invention is directed to a method of operating an air pressure differential system of an agricultural planter. The method includes the steps of: detecting, sensing, selecting and adjusting. The detecting step detects a ground speed of the planter. The sensing step senses an air pressure difference generated by the air pressure differential system. The selecting step selects a target air pressure differential value dependent upon the ground speed. The adjusting step adjusts a fan speed in an air pressure differential producing apparatus to thereby cause the air pressure difference to approximate the target air pressure differential value.

The present invention has certain advantages in that seed metering becomes more efficient, resulting in improved plant stands.

Another advantage of the present invention includes increasing the robustness of the planting system, allowing it to extend its effective ground speed operations.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
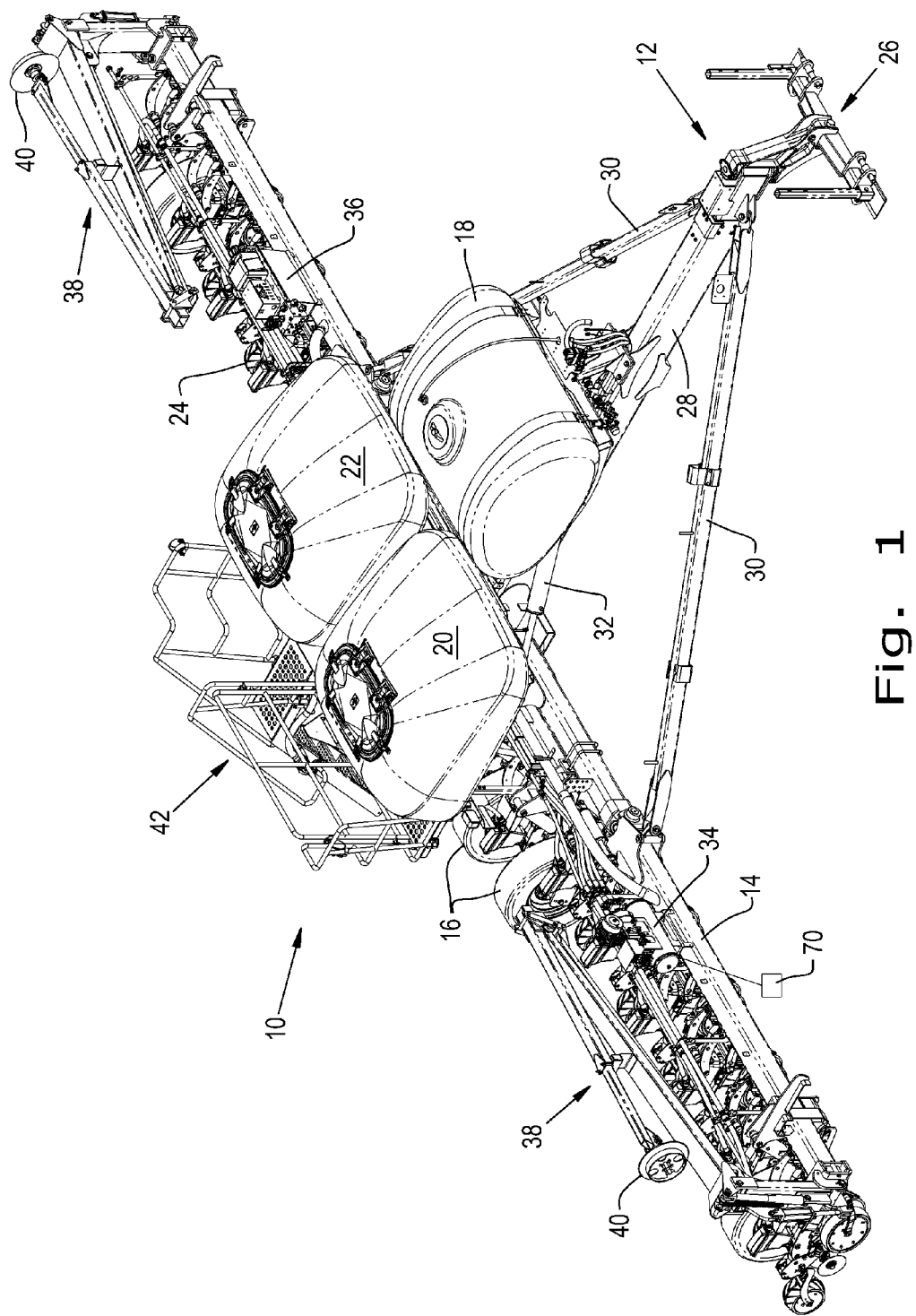
FIG. 1 is a perspective view of an agricultural planter using an air pressure differential system having an embodiment of a control system of the present invention.

Referring now to the drawings, and more particularly to FIG. 1, there is shown an embodiment of an agricultural planter 10 according to the present invention which generally includes a chassis forming a support structure for components of the planter 10 that can be formed by a hitch assembly 12 at a front of the planter 10 connected to a tool bar 14, main wheels 16 carried by the chassis near a rear of the planter 10, one or more storage tanks 18, 20, and 22 that can be filled with seed or other agriculture material carried by the chassis, and a plurality of row units 24 connected to the tool bar 14 and arranged laterally across a length of the tool bar 14 so that they are carried by the chassis. The hitch assembly 12 can include a hitch 26 configured to be connected to a tractor or other agricultural implement (not shown) so that the planter 10 can be pulled in a forward direction of travel. The hitch 26 can be integrally formed with or connected to a hitch bar 28 that is connected to the tool bar 14 by bracing bars 30 and one or more cylinders 32. As can be seen, the planter 10 can also have various hydraulic, pneumatic, and electrical lines (unnumbered) throughout to support various cylinders and systems that are included on the planter 10, such as a pneumatic system 34 connected to the tool bar 16 and an electric generator 36 also connected to the tool bar 16. A marking device 38 can be connected to each lateral end of the tool bar 14 and extendable so that a marking disc 40 of the marking device 38 can create a line in the soil as the planter 10 is pulled that helps a user in positioning the planter 10 to create subsequent rows. A stair assembly 42 can be mounted to the back of the planter 10 to allow for an operator to access the storage tanks 20, 22.

Figure 2:
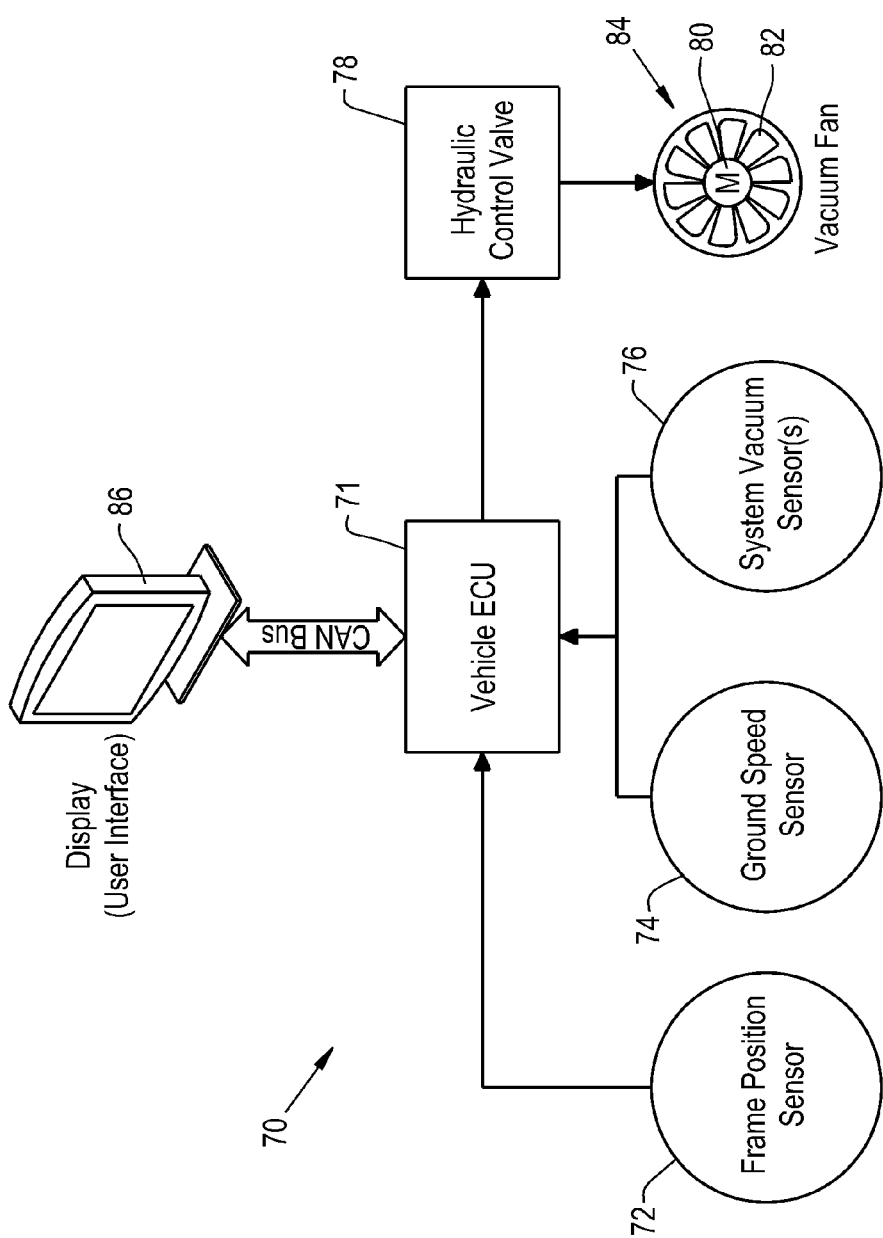
FIG. 2 is a schematic view of the control system used with the planter of FIG. 1.

Now, additionally referring to FIG. 2 there is shown a schematic representation of an air pressure differential system 70 (for the sake of clarity referred to herein as a vacuum system 70, although a positive pressure system is also applicable), having a controller 71, that interacts with a frame position sensor 72, a ground speed sensor 74 (which can be a GPS, a radar, or a signal sourced from a towing vehicle), a system vacuum sensor 76 and a hydraulic control valve 78. Hydraulic control valve 78 alters the fluid flow to a hydraulic motor 80 that drives a vacuum fan 82, which together can be considered a vacuum producing apparatus 84. Information from sensors 72, 74 and 76 respectively let controller 71 know the position of the frame, the ground speed of planter 10 and the level of vacuum that vacuum producing apparatus 84 is producing for the seeder mechanisms of planter 10.

Controller 71 is also coupled to a user interface 86, which may be located on planter 10 or upon a towing vehicle. User interface 86 allows an operator to input information to controller 71, such as information about the type of seed being planted and the selection of vacuum profiles for the controlling of the level of vacuum being supplied to the seeder units by vacuum producing apparatus 84.

Figure 3:
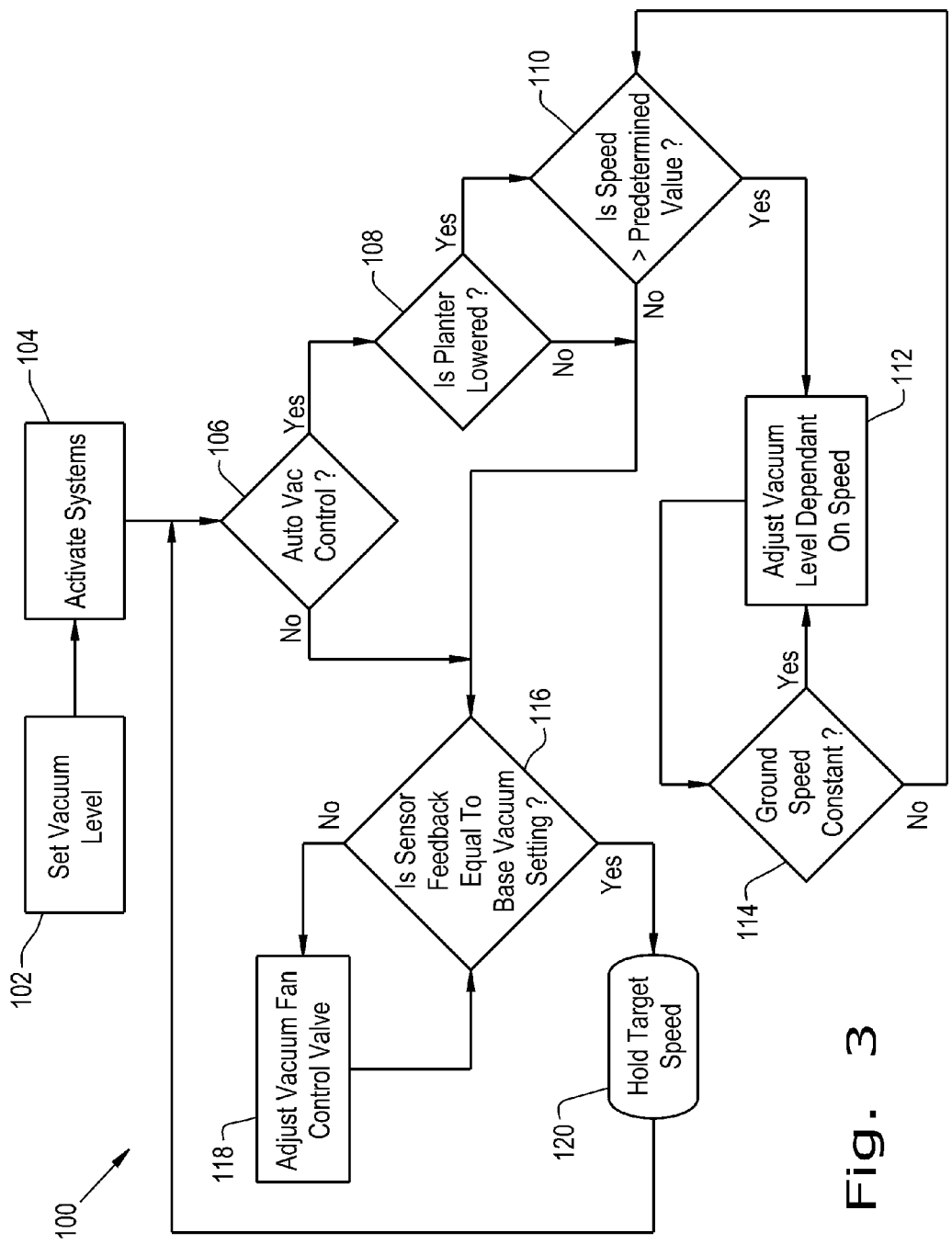
FIG. 3 is a flowchart illustrating an embodiment of a vacuum control method carried out on the controller depicted in FIG. 2.

Now, additionally referring to FIG. 3, there is shown a method 100 for the controlling of the vacuum level measured by vacuum sensor 76, by controlling the speed of fan 82. At step 102, an operator make selections on user interface 86 by setting the crop type and vacuum levels and profile to be used by planter 10 during the planting operation. Operational systems are activated at step 104 to ready planter 10 for the planting operation. At step 106 controller 37 determines if the vacuum control system 70 of the present invention is activated, if not, method 100 proceeds to step 116. If vacuum control system 70 has been activated then at step 108 controller 71 determines if frame position sensor 72 is indicating that planter 10 has been lowered in anticipation of the planting operation, if not, then method 100 proceeds to step 116. If the planter has been lowered, then controller 71 determines if the ground speed of planter 10 has exceeded a predetermined ground speed (step 110), such as 5 miles per hour (8 km/h), if not, then method 100 proceeds to step 116.

Figure 4:
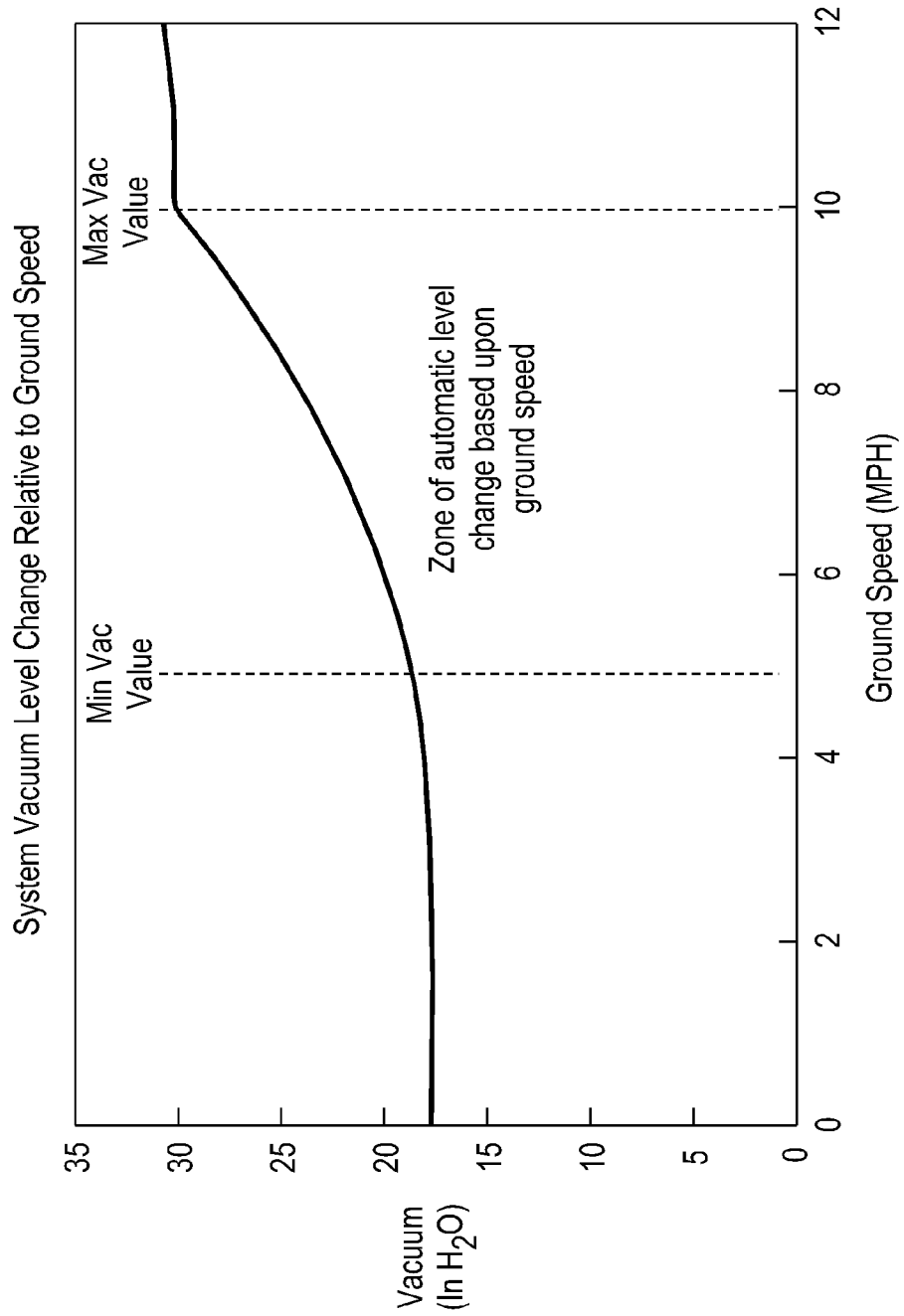
FIG. 4 is a graph showing an embodiment of an operating curve used by the method of FIG. 3.
Figure 5:
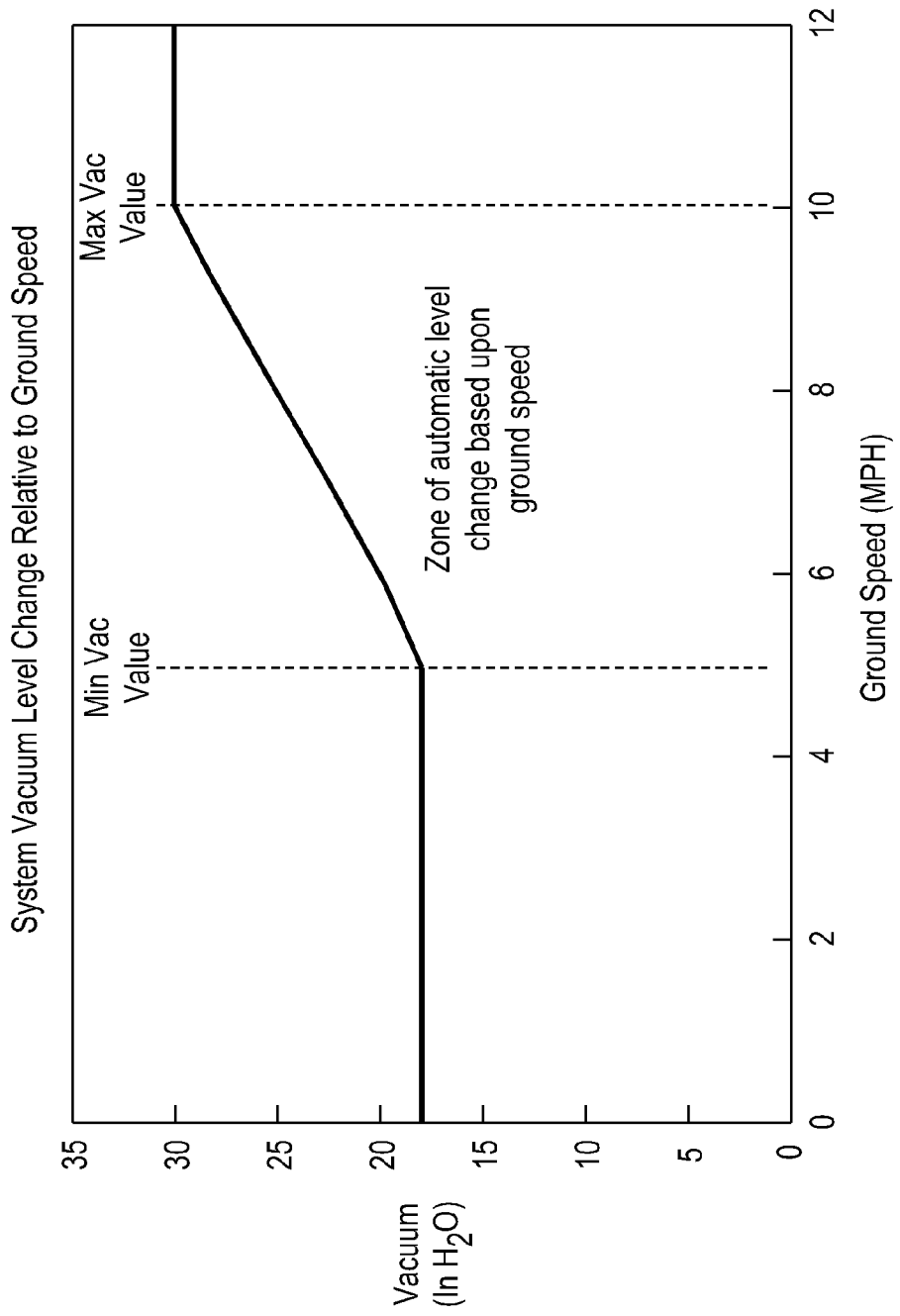
FIG. 5 is a graph showing another embodiment of an operating curve used by the method of FIG. 3.

Now, additionally referring to FIGS. 4 and 5, there are shown operating curves with vacuum levels depicted on the vertical axis and ground speed along the horizontal axis. If the ground speed of planter 10 is above the predetermined level (approximately 3 mph in FIG. 4, and 5 mph in FIG. 5) then the selected vacuum level for the indicated ground speed is achieved by controller 71 altering the flow of fluid through valve 78 to alter the speed of fan 82 (step 82) so that the selected vacuum level is accomplished. The vacuum level produced by vacuum producing apparatus 84 may level off once the ground speed of planter 10 reaches another predetermined value of, for example, 10 mph (16 km/h).

The present invention may use a linear change in vacuum as the ground speed changes as depicted in FIG. 5, a non-linear change as depicted in FIG. 4, or a piecewise linear change (not shown). It is contemplated that the adjustment of vacuum levels may be refined to alter the level by sections of row units, or by each row unit individually, perhaps by the use of further valves not shown. If the ground speed remains constant (step 114) then method 100 returns to step 112.

At step 116, if the output of sensor 76 is equal to the base vacuum setting, then that setting is held at step 120 and the process largely repeats, say by returning to step 106. If the output of sensor 76 indicates that a change is in order, then hydraulic control valve 78 is adjusted at step 118 to thereby alter the vacuum produced by fan 82.

The present invention addresses the issue of adjusting a planter's seed meter air force relative to a variable operating ground speed for systems dependent upon air for delivery of seed, either vacuum based or pressure based. Historically, planters were designed to operate effectively in a narrow band of speed ranges. Due to this narrow operating speed band, operator adjustments to air based seed metering systems, either pressure based or vacuum based, typically was performed infrequently and then typically only if the metering disk was changed or the seed being planted had significantly different physical properties in terms of size, shape, or density.

Seed metering systems are capable of planting at high speeds and the integration of sensors 72-76 provide feedback for critical performance factors such as seed planting quality, seed spacing, row unit ground contact pressures, meter ride quality, allowing the operating of planter 10 over a much wider ground speed operating range as it transverses the field. It has been found that in most instances a proportionally higher vacuum level or air pressure is required relative to increasing ground speed for proper seed metering performance. This change is related to the increase in force required to attach a seed to a rotating disk as the rotating disk increases in rotational speed.

In the prior art an operator would adjust the hydraulic flow control at the tractor or change a control setting via a cab mounted user interface device. For most modern day planters, this invention does not require a change in construction as most planters have on-board controllers and the necessary sensors needed to implement the present invention with the air systems being discussed. The area of change would be controller software based.

It is also contemplated to use sensors/inputs that further improve performance, such as seed delivery performance values, and row unit ride quality. Seed types vary by size, shape, density, and planting populations, therefore, the incremental force needed with speed change would not always be the same. As such, the system must know what crop type is being planted. This value is typically a result of data that the operator inputs into the in-cab display unit 86. The operator can also input the recommended air force target value based upon the seed type, seed size, and expected average ground speed, which is typically gleamed from the operator's manual and experience. Once entered, the on-board controller 71 selects the appropriate air force-ground speed performance curve (such as those represented in FIGS. 4 and 5) from a predefined software configuration table for the associated crop type, having a minimum and maximum value not to exceed, regardless of ground speed.

The operator user interface 86 provides for manual or automatic control of this feature. When in manual mode, the operator would have to initiate any change associated with ground speed changes. When the present invention is being carried out, in the automatic mode, the system looks for the implement work status signal. If the system is out-of-work, the last known value would be retrieved and used. If in-work is detected, controller 71 compares the current ground speed with the current air force value and compares the values to the predefined performance curve. If the values do not match, controller 71 sends out a signal to adjust the hydraulic drive by altering valve 78 to thereby either increase of decrease the air force in order to approximately match the desired values. The system 70 continues to monitor this state and make any necessary changes to match current conditions.

In some cases and crop types, the predefined performance curve may not yield maximum performance. A further enhancement of the system 70 is to also monitor seed delivery sensor values that are reporting seed singulation and seed multiples, hereafter known as seed performance values. Seed metering performance can be enhanced if the seed performance values are known. If the values are present and operation is in automatic mode, controller 71 adjusts the air force to the performance curve and then check the seed performance values. If seed skips is high, indicating seed is not adhered to the metering disk, additional air force would be provided until the seed skip value is acceptable. Conversely, if seed multiples are high, indicating more than one seed is being adhered to openings in the seed disk, the air force would be reduced from the performance curve value until the multiple value was at acceptable limits. Checks would be on-going whenever the machine is in the in-work mode of operation.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural planter, comprising:
   a frame member;
   a conveyance system coupled to said frame member, said conveyance system allowing for the movement of the planter at a ground speed;
   a seeding system coupled to said frame member; and
   an air pressure differential system operatively coupled to said seeding system, said air pressure differential system including:
   an air pressure differential producing apparatus for producing an air pressure difference; and
   a controller in controlling communication with said air pressure differential producing apparatus, said controller being configured to select the air pressure difference dependent upon the ground speed of the planter; wherein said controller keeps the air pressure difference at a substantially constant first value until the ground speed exceeds a first predetermined value.

2. The agricultural planter of claim 1, wherein said controller keeps the air pressure difference at a substantially constant second value once the ground speed exceeds a second predetermined value.

3. The agricultural planter of claim 2, wherein said controller adjusts the air pressure difference when the ground speed is between said first predetermined value and said second predetermined value.

4. The agricultural planter of claim 3, wherein said controller adjusts the air pressure difference at a linear rate between said first value and said second value when the ground speed is between said first predetermined value and said second predetermined value.

5. The agricultural planter of claim 4, wherein said first value is approximately 5 miles per hour and said second value is approximately 10 miles per hour.

6. The agricultural planter of claim 3, wherein said controller adjusts the air pressure difference at one of a non-linear rate and a piecewise linear rate between said first value and said second value when the ground speed is between said first predetermined value and said second predetermined value.

7. The agricultural planter of claim 1, wherein said controller is configured to execute the steps of:
   detecting the ground speed of the planter;
   sensing the air pressure difference;
   selecting a target air pressure differential value dependent upon the ground speed; and adjusting a fan speed in said air pressure differential producing apparatus to thereby cause the air pressure difference to approximate said target air pressure differential value.

8. The agricultural planter of claim 7, wherein said adjusting step is only carried out if the ground speed is above a first predetermined value and below a second predetermined value.

9. The agricultural planter of claim 8, wherein said controller is a vehicle controller.

10. An air pressure differential system for use on an agricultural planter, the planter capable of traveling at a ground speed when towed, the air pressure differential system, comprising:
 an air pressure differential producing apparatus for producing an air pressure difference; and
 a controller in controlling communication with said air pressure differential producing apparatus, said controller being configured to select the air pressure difference dependent upon the ground speed of the planter;
 wherein said controller keeps the air pressure difference at a substantially constant first value until the ground speed exceeds a first predetermined value.

11. The air pressure differential system of claim 10, wherein said controller keeps the air pressure difference at a substantially constant second value once the ground speed exceeds a second predetermined value.

12. The air pressure differential system of claim 11, wherein said controller adjusts the air pressure difference when the ground speed is between said first predetermined value and said second predetermined value.

13. The air pressure differential system of claim 12, wherein said controller adjusts the air pressure difference at a linear rate between said first value and said second value when the ground speed is between said first predetermined value and said second predetermined value.

14. The air pressure differential system of claim 13, wherein said first value is approximately 5 miles per hour and said second value is approximately 10 miles per hour.

15. The air pressure differential system of claim 12, wherein said controller adjusts the air pressure difference at one of a non-linear rate and a piecewise linear rate between said first value and said second value when the ground speed is between said first predetermined value and said second predetermined value.

16. A method of operating an air pressure differential system of an agricultural planter, the method comprising the steps of:
 detecting a ground speed of the planter;
 sensing an air pressure difference generated by the air pressure differential system;
 selecting a target air pressure differential value dependent upon the ground speed; and
 adjusting a fan speed in an air pressure differential producing apparatus to thereby cause the air pressure difference to approximate said target air pressure differential value.

17. The method of claim 16, wherein said adjusting step is only carried out if the ground speed is above a first predetermined speed and below a second predetermined speed.

18. The method of claim 17, wherein said selecting step is carried out between said first predetermined speed and said second predetermined speed in one of a linear, non-linear and piecewise linear fashion between a first air pressure differential level at said first predetermined speed and a second air pressure differential level at a second predetermined speed, said second air pressure differential level being a lower pressure relative to atmospheric air than said first air pressure differential level.

* * * * *